(12) United States Patent
Li et al.

(10) Patent No.: US 11,523,564 B2
(45) Date of Patent: Dec. 13, 2022

(54) TRIMMER

(71) Applicant: Globe (Jiangsu) Co., Ltd, Jiangsu (CN)

(72) Inventors: Jianbo Li, Jiangsu (CN); Erbiao Zhou, Jiangsu (CN); Yongxing Ma, Jiangsu (CN)

(73) Assignee: Globe (Jiangsu) Co., Ltd, Changzhou (CN)

( * ) Notice: Subject to any disclaimer, the term of this patent is extended or adjusted under 35 U.S.C. 154(b) by 258 days.

(21) Appl. No.: 16/904,828

(22) Filed: Jun. 18, 2020

(65) Prior Publication Data

US 2020/0396906 A1     Dec. 24, 2020

(30) Foreign Application Priority Data

Jun. 18, 2019   (CN) .......................... 201910525537.2
Dec. 12, 2019   (CN) .......................... 201911292504.4
Dec. 17, 2019   (CN) .......................... 201911300515.2

(51) Int. Cl.
| | |
|---|---|
| *H02K 7/02* | (2006.01) |
| *A01G 3/053* | (2006.01) |
| *B25F 5/00* | (2006.01) |
| *F02B 63/02* | (2006.01) |
| *H02K 7/14* | (2006.01) |

(52) U.S. Cl.
CPC .............. *A01G 3/053* (2013.01); *B25F 5/008* (2013.01); *F02B 63/02* (2013.01); *H02K 7/02* (2013.01); *H02K 7/145* (2013.01); *H02K 2209/00* (2013.01)

(58) Field of Classification Search
CPC ....... H02K 7/02; H02K 7/145; H02K 2209/00
See application file for complete search history.

(56) References Cited

U.S. PATENT DOCUMENTS

| | | | | |
|---|---|---|---|---|
| 3,140,413 | A | * 7/1964 | Terry | ..................... H02K 19/20 310/74 |
| 6,031,306 | A | * 2/2000 | Permuy | .................. H02K 11/33 310/67 R |
| 7,320,384 | B2 | * 1/2008 | Huang | ................ F16H 57/0434 184/11.1 |

(Continued)

FOREIGN PATENT DOCUMENTS

| | | |
|---|---|---|
| DE | 3343772 A1 | 6/1985 |
| EP | 3162190 A1 | 5/2017 |

OTHER PUBLICATIONS

Extended Search Report of Counterpart European Patent Application No. 20180749.2 dated Oct. 30, 2020.

*Primary Examiner* — Dang D Le

(57) ABSTRACT

A trimmer includes a handle assembly, a power mechanism installed at one end of the handle assembly, and a blade assembly connected to the power mechanism. The power mechanism has a housing assembly, a motor received in the housing assembly, and a power transmission assembly mounted on the housing assembly. The motor is an external rotor motor with a diameter greater than or equal to 50 mm. The power transmission assembly has pinion coaxially sleeved on an output shaft of the motor and a big gear meshing with the small gear, and a transmission ratio of the small gear to the big gear is less than 6. By such arrangement, the trimmer can obtain the best output effect under a condition that the output power of the motor is unchanged.

15 Claims, 13 Drawing Sheets

(56) References Cited

U.S. PATENT DOCUMENTS

| | | | |
|---|---|---|---|
| 8,207,647 B2* | 6/2012 | Du | H02K 3/325 310/216.091 |
| 2010/0218385 A1 | 9/2010 | Mang et al. | |
| 2017/0071134 A1 | 3/2017 | Li et al. | |
| 2018/0104809 A1 | 4/2018 | Dyer et al. | |
| 2018/0139907 A1* | 5/2018 | Li | A01G 3/053 |

* cited by examiner

TRIMMER

CROSS-REFERENCE TO RELATED APPLICATIONS

This application is a US application which claims the priority of three CN Applications respectively numbered as CN201910525537.2 which is filed on Jun. 18, 2019; CN201911292504.4 which is filed on Dec. 12, 2019; CN201911300515.2 which is filed on Dec. 17, 2019, the contents of which are incorporated herein by reference in their entirety.

TECHNICAL FIELD

The present invention relates to a trimmer.

BACKGROUND

Electric trimmer is a device for trimming various outdoor plants such as various bushes, hedges and green plants. In general, the power of trimmer is high speed and high transmission ratio output. The disadvantage of the trimmer is that the heat is more serious and requires good heat dissipation, which will consume a lot of electrical energy and reduce the use time.

In the prior art, there are some trimmers using external rotor motors, however, the relative research on external rotor motors is only mentioned to apply but not specifically focus on details which type of external rotor motor can drive the electric trimmer to achieve better performance, at the same time, how to arrange the external rotor motor and how to use the matching heat dissipation structure are also difficulties in current research in the field of electric trimmers.

In view of this, it is indeed necessary to make further improvements to the current trimmer to solve the above problems.

SUMMARY OF INVENTION

It is an object of the present invention to provide a lawn mower that saves time and effort when starting the cutter system of the lawn mower, and can reduce the operator's operational difficulty.

To achieve the above object, the present invention provides a trimmer, comprises a handle assembly, a power mechanism locating at one end of the handle assembly and having a housing assembly, the external rotor motor having an output shaft and the power transmission assembly having a pinion mounted on the output shaft of the external rotor motor and a big gear engaging with the pinion, and a blade assembly connected to the power mechanism, wherein the motor is an external rotor motor which has a diameter greater or equal to 50 mm, and wherein a transmission ratio between the pinion and the big gear is less than 6.

In some embodiment, the diameter of the motor is 64 mm, and the transmission ratio between the pinion and the big gear is 2.7.

In some embodiment, the power transmission assembly includes two eccentric wheel assembly respectively located at two opposite sides of the big gear and two crank rods each surrounding the corresponding eccentric-wheel assembly, and wherein the blade assembly and the eccentric wheel assembly are respectively located at two opposite sides of the crank rods.

In some embodiment, the motor has an external rotor surrounding the output shaft thereof and a chassis for housing the external rotor and the output shaft, and wherein a gap is formed between the external rotor and the chassis.

In some embodiment, the power transmission assembly has a bottom cover connected to a bottom of the housing assembly and a fan sandwiched between the bottom cover and the housing assembly, wherein the bottom cover defines a blower chamber for receiving the fan and a heat dissipation channel extending there through for air passing from the blower chamber to outside.

In some embodiment, the fan is connected to the output shaft of the motor, and wherein the heat dissipation is located at one side of the bottom cover away from the blade assembly.

In some embodiment, the bottom cover has two vents extending there through for communicating the blower chamber with outside, and wherein both heat dissipation channel and the vents are located below the fan.

In some embodiment, the bottom cover also includes at least two heat dissipation fins extending along a longitudinal direction thereof, and wherein each heat dissipation passage is formed between two adjacent heat dissipation fins, and wherein the blower chamber is surrounded by two outermost heat dissipation fins, and wherein each heat dissipation passage has one end communicating with the blower chamber and the other end communicating with the outside.

In some embodiment, the motor has a stator mounted to the output shaft and an external rotor surrounded the stator, and wherein a flywheel flange is located on an outside of the external rotor.

In some embodiment, a flywheel flange is located on an outside of the big gear.

In some embodiment, the external rotor is configured with a drum, shape, and wherein the motor includes a motor end cover located at one end of the external motor, and wherein the flywheel flange is formed on the outside of the motor end cover.

In some embodiment, the flywheel flange, the motor end cover and the external rotor may be connected by fasteners, adhesives or welding, or may be integrally formed.

In some embodiment, the flywheel flange outwardly protrudes a certain distance from the external rotor in both the axial and the radial directions of the external rotor, and wherein the flywheel flange forms an annular flange in a circumferential direction of the external rotor.

In some embodiment, a radius of the flywheel flange is 5-15 mm larger than that of the external rotor, and wherein an inner radius of the flywheel flange and the radius of the external rotor are 27 mm, and wherein an outer radius of the flywheel flange is 32 mm-42 mm, and the height of the flywheel flange is 2 mm-45 mm.

In some embodiment, the flywheel flange is disposed on an outer periphery of the big gear, and wherein the flywheel flange extends outwardly from the big gear in both the axial direction and the radial direction of the big gear, and wherein two recesses are form on two opposite sides of the big gear.

In some embodiment, an inner diameter of the flange flywheel is 40 mm, and wherein an outer diameter of the flywheel flange is 54 mm-74 mm and the height of the flywheel flange is 5 mm-13 mm.

The beneficial effects of the present invention are: The trimmer of the present invention has an external rotor motor and a small transmission ratio, thereby ensuring the best output effect is obtained under a condition that the output power of the motor is unchanged, and the motor has a low speed, a large rotating torque, a low current, a small heat generation, and a greatly increased energy consumption ratio, so as to effectively control the temperature rise of the motor and reduce no-load load, improve energy efficiency and extend the life of motor. Furthermore, the trimmer designs the top cover over the motor as a metal top cover, so that the trimmer not only has a good heat dissipation effect, but also has a waterproof and dust-proof effect, and so that it can work in a rainy day and a wet area without affecting the performance of the whole machine. Besides, the trimmer increases the inertia of the rotor by outputting a flywheel flange outside the external rotor motor or the big gear to output a large torque so as to obtain a well cutting performance.

DESCRIPTION OF EMBODIMENTS

In order to make the objects, technical solutions and advantages of the present invention more clear, the present invention will be described in detail below with reference to the drawings and specific embodiments.

Figure 1:
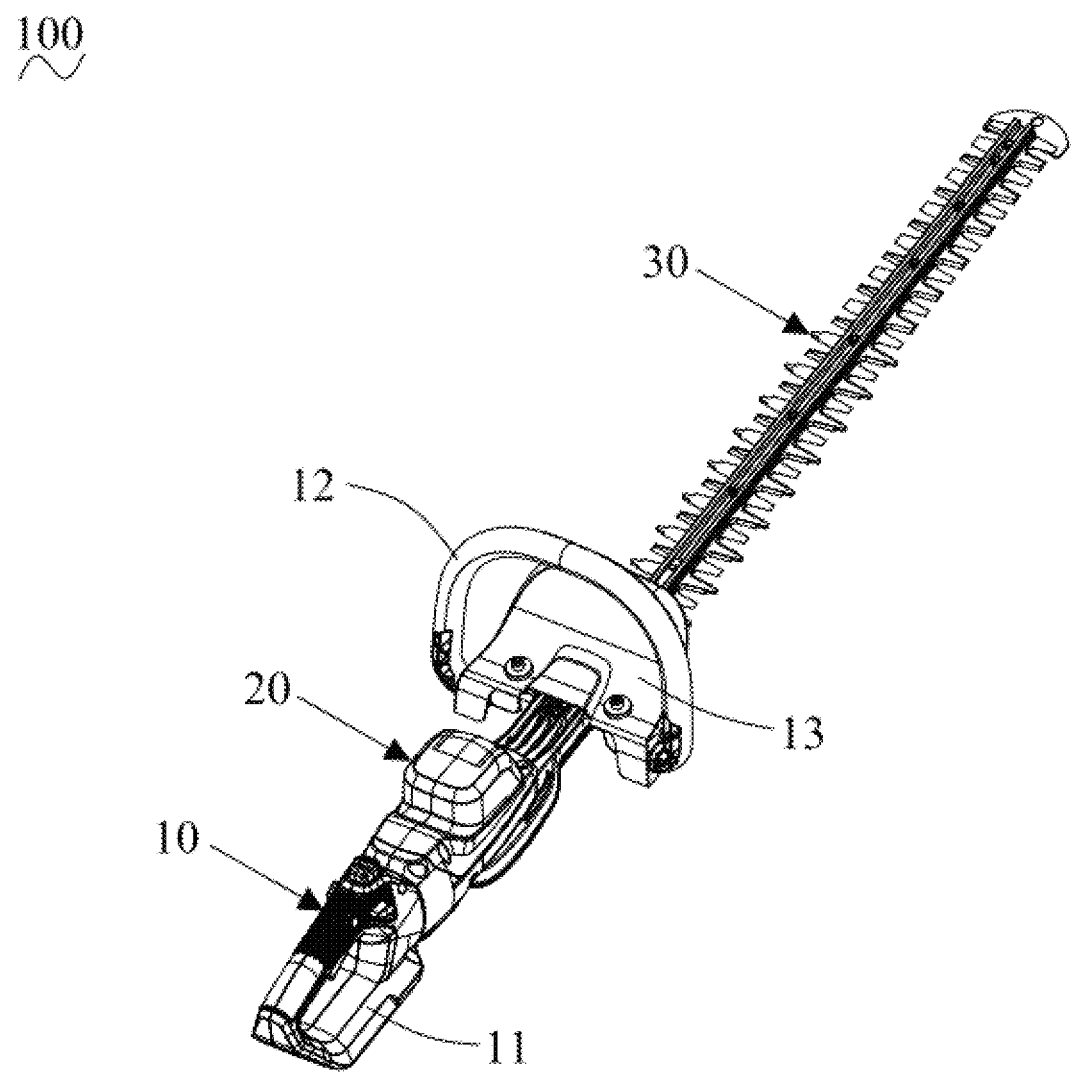
FIG. 1 is an assembled perspective view of a trimmer according to a first embodiment of the present invention.
Figure 2:
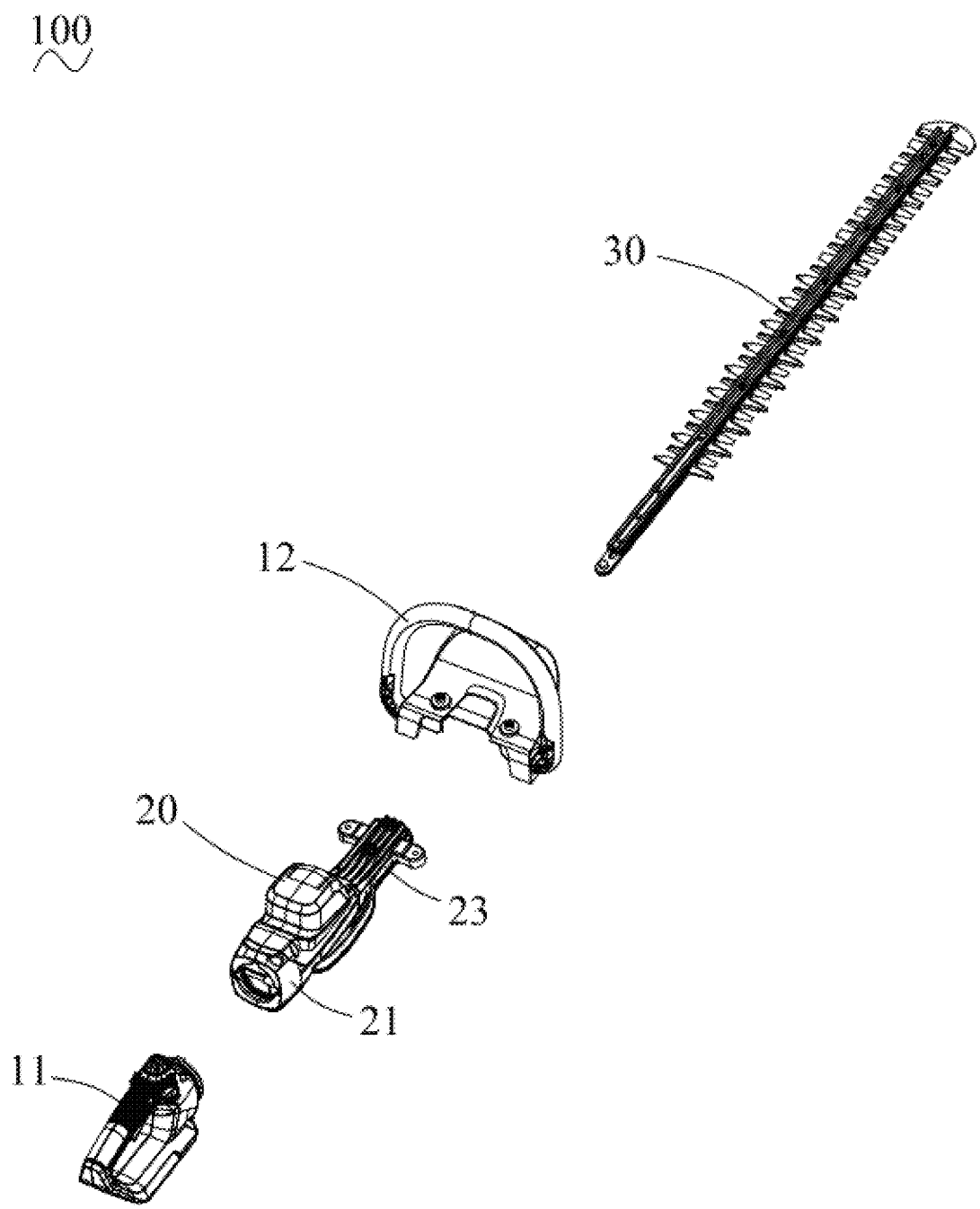
FIG. 2 is an exploded perspective view of a trimmer shown in FIG.

Please refer to FIG. 1 and FIG. 2, a trimmer 100 according to an embodiment in present invention, includes a handle assembly 10, a power mechanism 20 installed at an end of the handle assembly 10, and a blade assembly 30 connected to the power mechanism 20.

Figure 3:
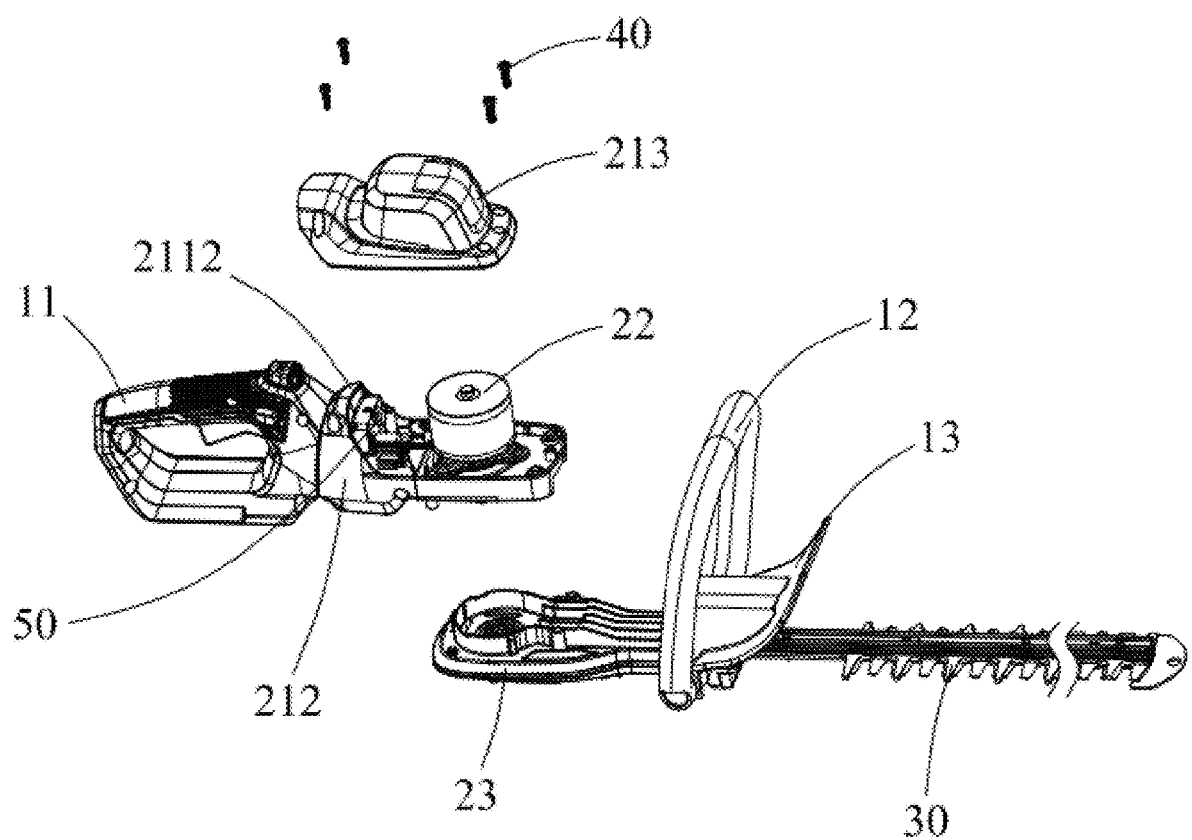
FIG. 3 is another exploded view of the trimmer shown in FIG. 1.
Figure 4:
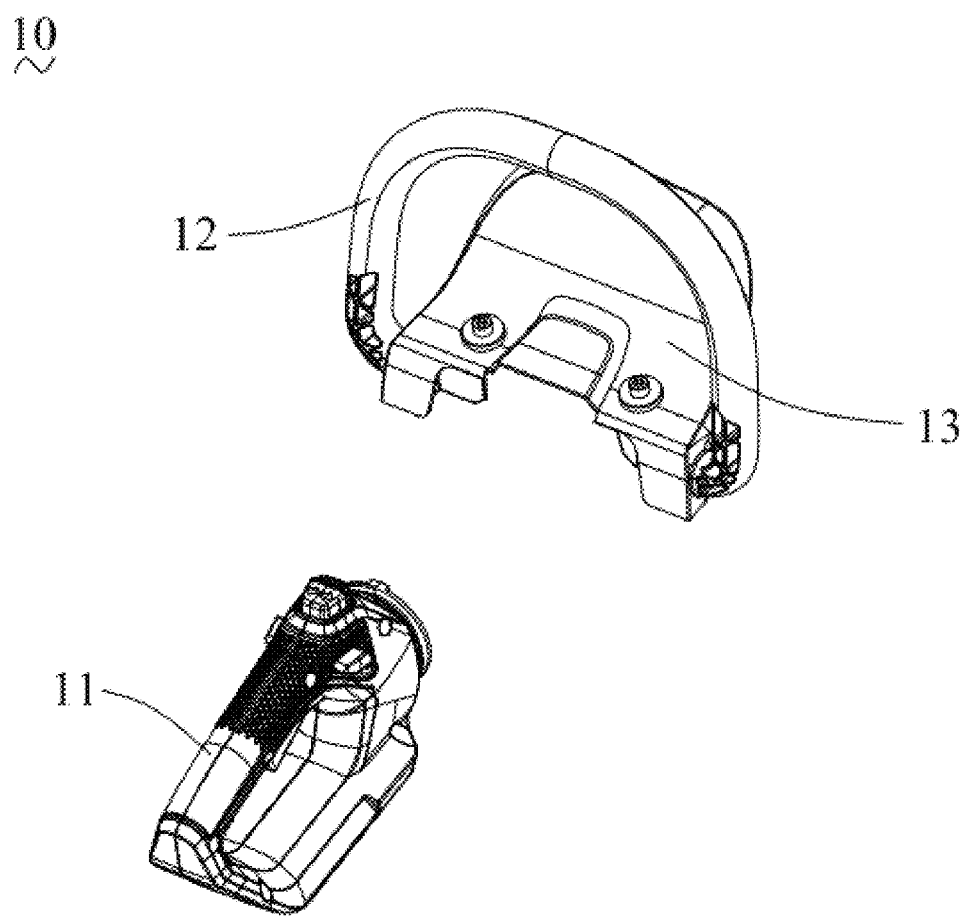
FIG. 4 is an exploded view of a handle assembly of FIG. 2.

Please refer to FIG. 3 and FIG. 4, the handle assembly 10 includes a main handle 11, a sub-handle 12 and a protective plate 13, the main handle 11 is a grippable handle structure with a cavity, and main knife switch, speed control switch, etc. are all provided on the main handle 11 for user to operate. The main handle 11 and the sub-handle 12 are respectively disposed at two opposite ends of the power mechanism 20, and the sub-handle 12 is disposed near the blade assembly 30, so as to be convenient for user to hold and to safely start protection. The protective plate 13 is integrally formed with the sub-handle 12 to play a protective role.

Figure 5:
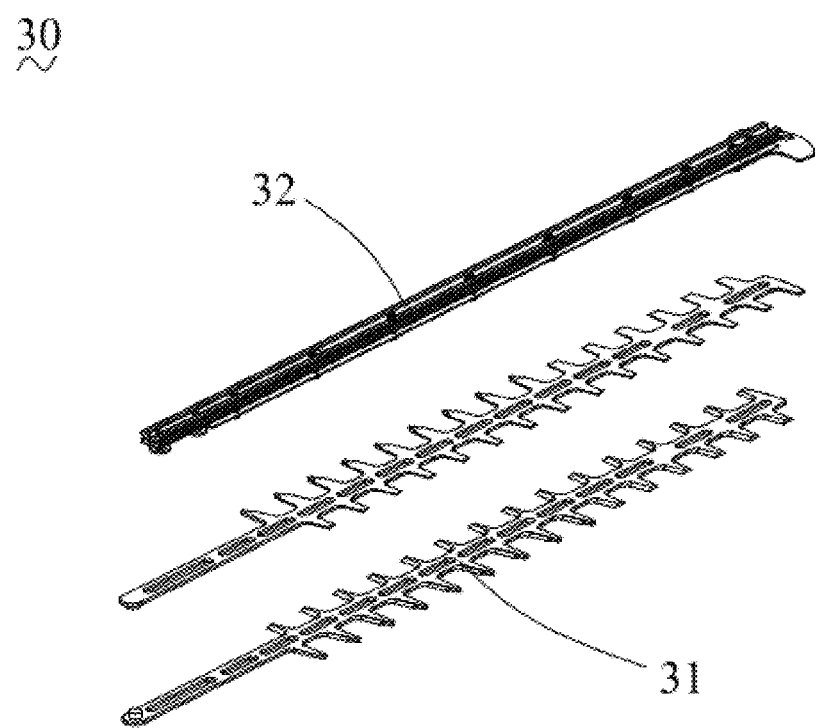
FIG. 5 is an exploded view of a blade assembly of FIG. 2.
Figure 6:
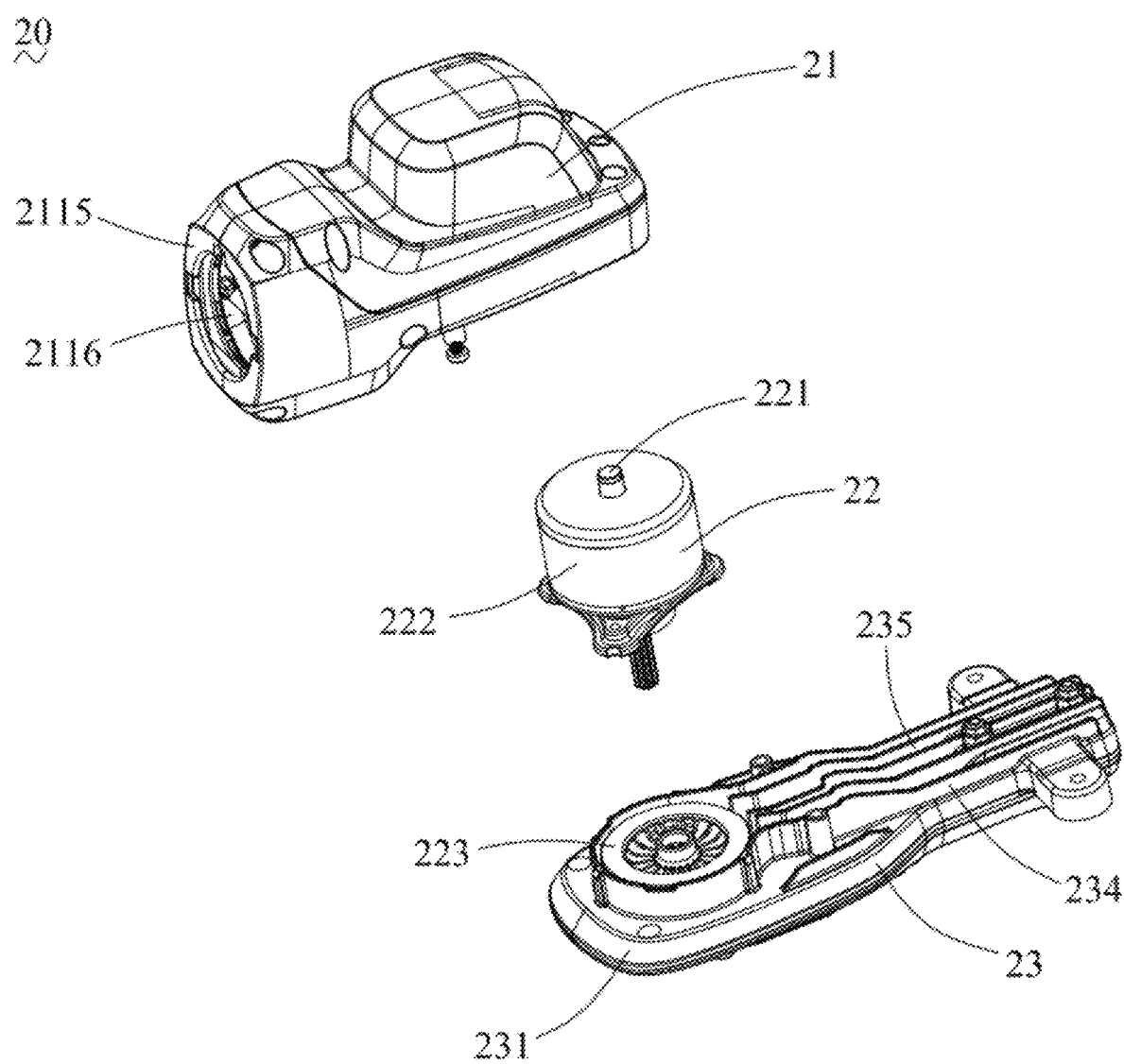
FIG. 6 is an exploded view of a power mechanism in FIG. 2.
Figure 7:
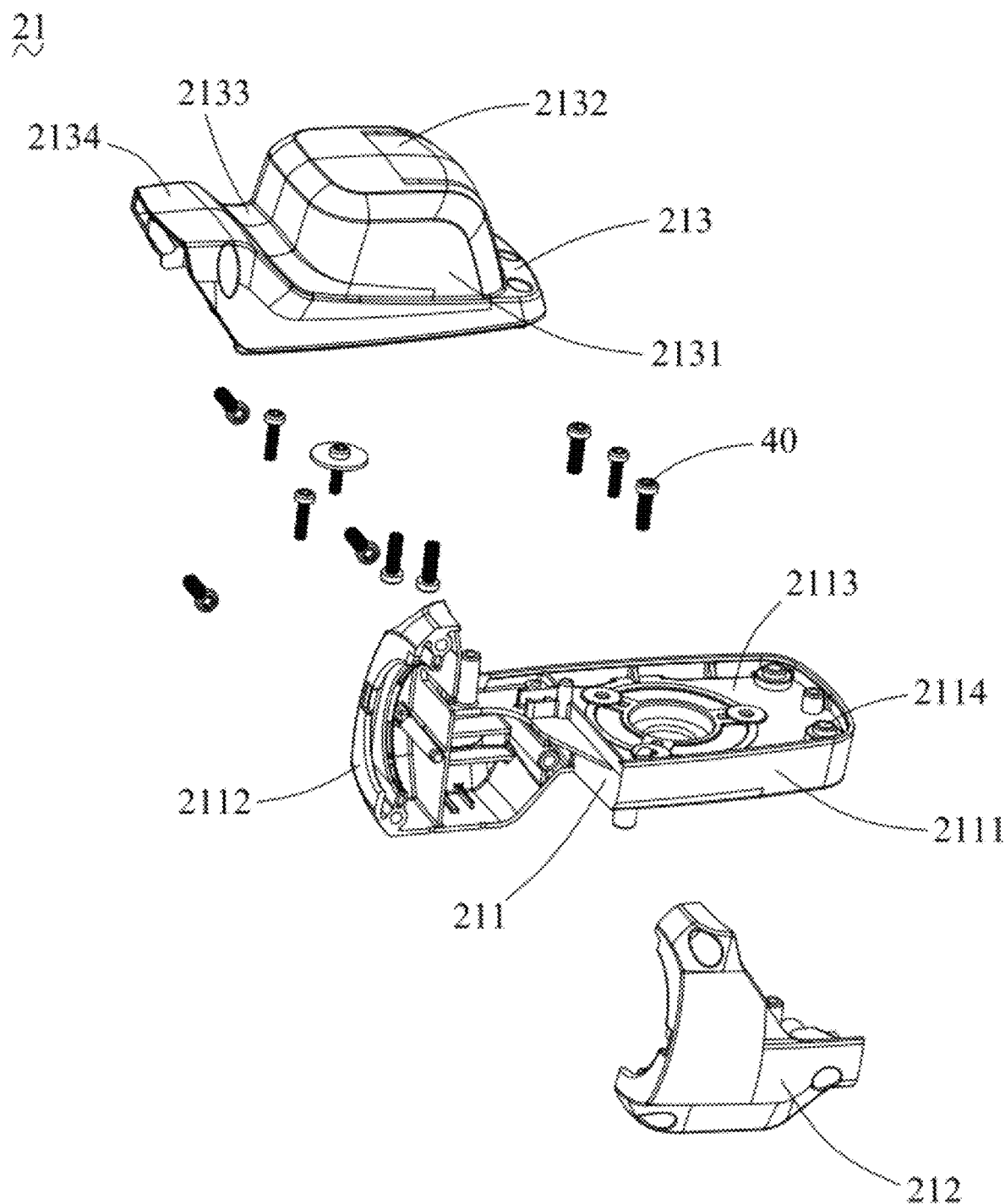
FIG. 7 is an exploded view of a housing assembly of FIG. 6.
Figure 8:
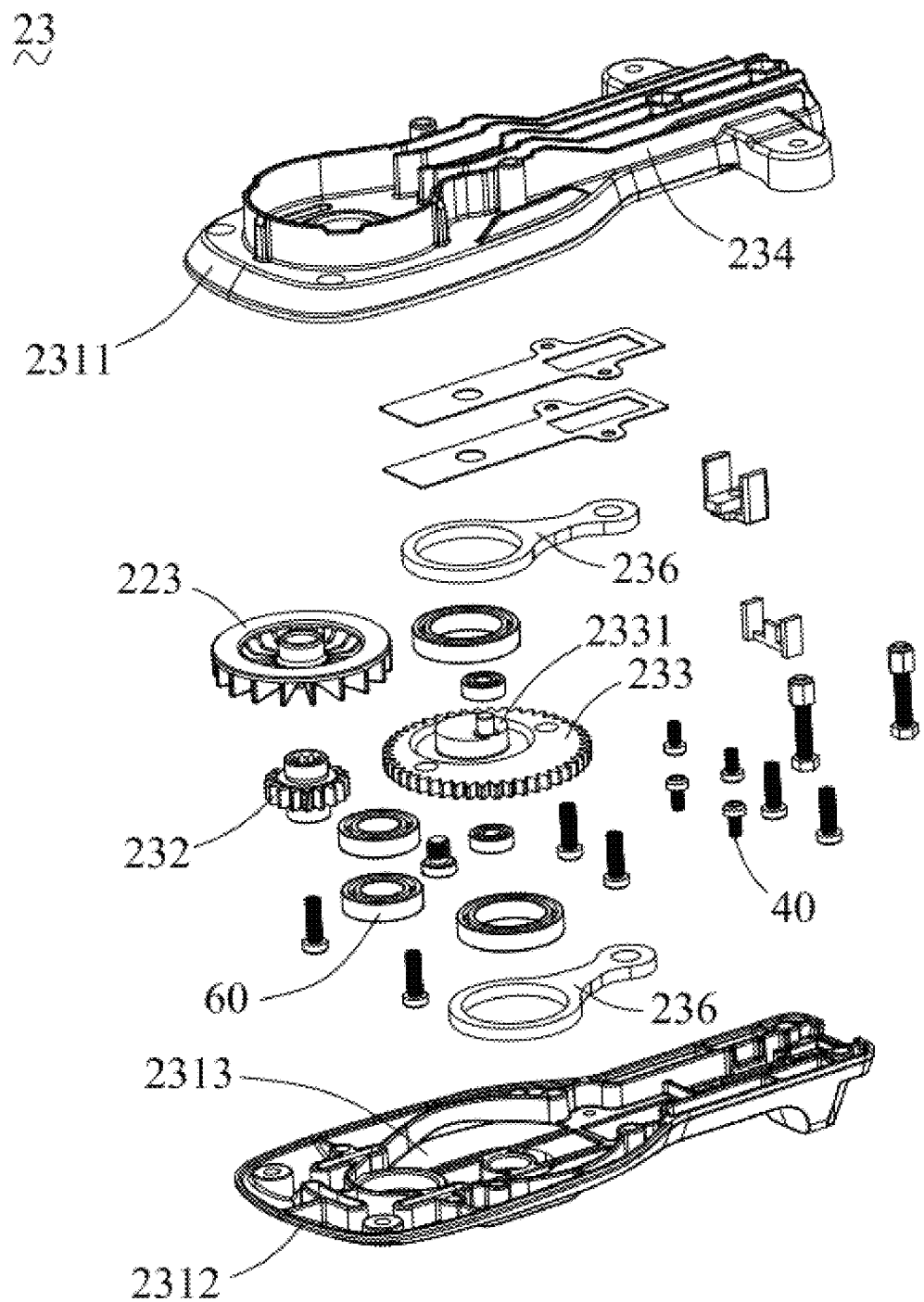
FIG. 8 is an exploded view of a power transmission assembly in FIG. 6.
Figure 9:
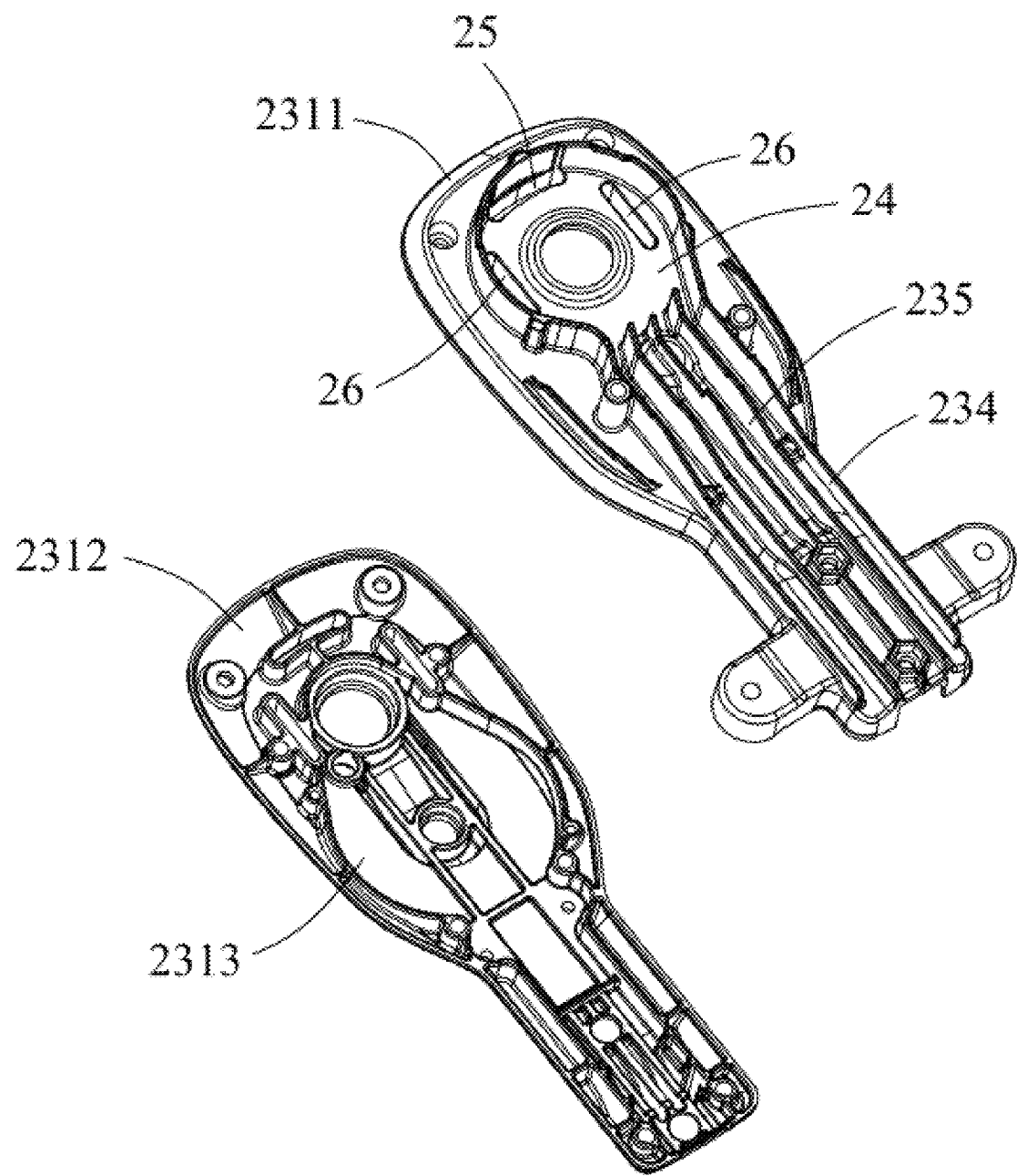
FIG. 9 is an exploded view of a bottom cover in FIG. 8.
Figure 10:
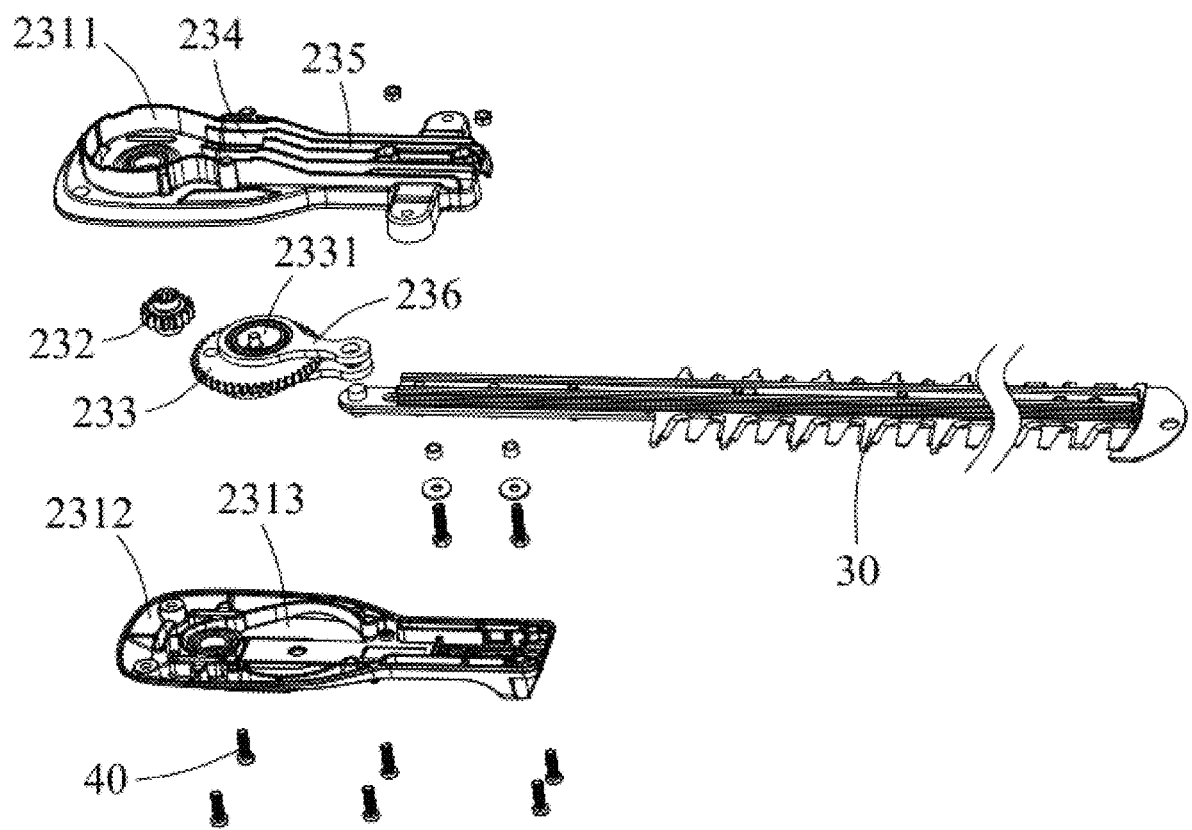
FIG. 10 show the power transmission assembly shown in FIG. 8. engages with the blade assembly.

Please refer to FIG. 3 and FIG. 5, the blade assembly 30 includes a pair of cutting blades 31 and a protective decorative plate 32, the pair of cutting blades 31 is detestably and slidably arranged with the power mechanism 20 so as to be driven by the power mechanism 20 and perform the cutting operation. The protective decorative plate 32 is fixedly arranged to a middle position of the cutting blades 31 and is above the pair of cutting blades 31.

Since both the handle assembly 10 and the blade assembly 30 belong to existing structures, they will not be described in detail here, and the power mechanism 20 will be described in detail in the following description.

Please refer to FIG. 6 to FIG. 10, and in conjunction with FIG. 3, the power mechanism 20 includes a housing assembly 21, a motor 22 received in the housing assembly 21 and a power transmission assembly 23 mounted on the housing assembly 21. The housing assembly 21 includes a first housing 211, a second housing 212, and a top cover 213 covering the first housing 211 and the second housing 212. In present invention, the top cover 213 is a metal top cover, the first shell 211 and the second shell 212 are both metal shells, and the first shell 211 is installed to the handle assembly 10, the second shell 212 is installed to the first shell 211. Of course, the top cover 213 may also be a plastic top cover, as long as it can achieve the same effect, and its material is not limited herein.

The first housing 211 includes a bottom housing 2111 and a side portion 2112 protruding from the bottom housing 2111 toward the handle assembly 10, an installation cavity 2113 is formed on the bottom housing 2111, and the motor 22 is installed therein. The bottom shell 2111 is further provided with a plurality of fixing holes 2114, which penetrate the bottom shell 2111 and communicate with the installation cavity 2113 for screws 40 passing through, so that the screws 40 can pass through the fixing holes 2114 to fix the bottom housing 2111 and the power transmission assembly 23.

The side portion 2112 protrudes from the bottom housing 2111 and is fixed to the main handle 11. A side of the side portion 2112 near the main handle 11 is semicircular, the second housing 212 is fixedly connected to the side portion 2112, and a side of the second housing 212 near the main handle 11 is also semicircular, so that a circular limiting portion 2115 is formed after the second housing 212 and the side portion 2112 are assembled together. The circular limiting portion 2115 has a circular opening 2116 facing the main handle 11, the limiting portion 2115 is mainly used for snap fitting with the housing of the main handle 11, and the circular opening 2116 is used for the housing of the main handle 11 passing through, therefore, it is convenient for the main handle 11 housing to be latched with the side portion 2112 and the second housing 212.

The metal top cover 213 is installed on the bottom housing 2111 and covers the motor 22 to close the installation cavity 2113. The metal top cover 213 is integrally formed and has a heat dissipation surface 2131, the first housing 211 and the second housing 212 are both metal housings, so that the heat generated by the motor 22 during working in the metal top cover 213 is emitted by the heat dissipation surface 2131, the first housing 211 and the second housing 212, so as to improve a heat dissipation efficiency of the trimmer 100.

The metal top cover 213 includes an arched protrusion 2132, a concave portion 2133 around the arched protrusion 2132, and a mounting portion 2134 tilted toward the main handle 11 from a side of the concave portion 2133, and the mounting portion 2134 is also installed on the side portion 2112 and the second housing 212 at the same time. In an axial direction of the motor 22, an upper surface of the concave portion 2133 is lower than an upper surface of the mounting portion 2134, so that in a humid environment or rainy days, rainwater located at an edge of the mounting portion 2134 will slip along the mounting portion 2134 to the recess 2133 and fall. It can be seen that the metal top cover 213 is also waterproof and dust-proof.

The side portion 2112 and the second housing 212 are provided with a PCB board assembly 50 at positions thereof adjacent to the main handle 11. The PCB board assembly 50 are shielded on a bottom of the metal top cover 213. The purpose of this design is: the PCB board assembly 50 can protect its core components by the metal top cover 213, that is mainly reflected in; 1. the metal top cover 213 is used to dissipate heat to prevent the PCB board assembly 50 from being damaged due to excessive temperature; 2. the metal top cover 213 is waterproof and dust-proof.

In this embodiment, the assembly of the side portion 2112 and the second housing 212, the assembly of the metal top cover 213, the first housing 211 and second housing and 212 are both achieved via the engagements of the screws 40 and the screw holes. Of course, in other embodiments, the assembly of the side portion 2112 and the second shell 212, the assembly of the metal top cover 213, the first shell 211 and the second shell 212 can also use other manners, which is not limited herein.

In this embodiment, the motor 22 is an external rotor motor with a diameter greater than or equal to 50 mm, and includes an output shaft 221, an external rotor (not shown) sleeved on the output shaft 221, and a chassis 222 sleeved on an external side of the external rotor and the output shaft 221. Since the motor 22 is an external rotor motor, that is, the external rotor is rotated to drive the motor 22 to operate and then drive the trimmer 100 to work, so the external rotor cannot be too close to the chassis 222, an avoidance gap (not shown) needs to be formed between the external rotor and the chassis 222, but the avoidance gap may cause heat to be hardly dissipated. Therefore, the metal top cover 213 is disposed to quickly dissipate the heat and improves the heat dissipation efficiency of the trimmer 100.

A fan 223 is provided at an end of the output shaft 221, and is located at a bottom of the bottom housing 2111 to dissipate heat on the bottom of the case assembly 21, thereby playing a role in cooling. Preferably, the fan 223 is mounted within the power transmission assembly 23 to simultaneously dissipate heat generated by the power transmission assembly 23, so as to cool the power transmission assembly 23.

The power transmission assembly 23 includes a bottom cover 231 mounted to the bottom of the housing assembly 21, a pinion 232 and a big gear 233 the pinion 232 and the big gear 233 are mounted to the bottom cover 231 and mesh with each other. The bottom cover 231 is formed with at least two heat dissipation fins 234 on a side thereof near the blade assembly 30, and a heat dissipation passage 235 is formed between each two adjacent heat dissipation fins 234.

The bottom cover 231 is formed with a blower chamber 24 that completely covers the outside of the fan 223 on a side thereof away from the blade assembly 30 and a heat dissipation channel 25 being located at the bottom of the blower chamber 24 and communicating with the outside. The fan 223 is accommodated in the bottom cover 231 and connected to the output shaft 221 of the motor 22, the blower chamber 24 is formed by two outermost heat dissipation fins 234 and is disposed in a closed setting, the heat dissipation channel 25 is opened on an edge of the bottom cover 231 away from the blade assembly 30, and extends elongate in a width direction of the bottom cover 231.

The blower chamber 24 has two vents 26 communicating with the outside on a bottom thereof, and the vents 26 extend elongate in a length direction of the bottom cover 231. Therefore, when the motor shaft 221 rotates, the fan 223 can be driven to rotate, and when the fan 223 rotates, a low-pressure area is generated near the fan 223, at this time, the vents 26 can supplement external cold air and discharge internal hot air by the heat dissipation channel 25 to improve the heat dissipation effect.

In the present invention, the heat dissipation channel 25 and the vents 26 are designed to be elongated, and communicate the blower chamber 24 and the outside in a thickness direction of the bottom cover 231, the purpose is: the elongated structure can increase a contact area of cold/hot air with the corresponding vent 26/heat dissipation channel 25, so that the heat dissipation effect is better, but it should not be limited to this.

The bottom cover 231 includes a first bottom cover 2311, a second bottom cover 2312 assembled up and down, and a receiving cavity 2313 formed between the first bottom cover 2311 and the second bottom cover 2312, in which the pinion 232 and the big gear 233 are received. The pinion 232 is co-axially sleeved on the output shaft 221 of the motor 22, the diameter of the pinion 232 is smaller than the diameter of the big gear 233, so that when the motor 22 rotates, the pinion 232 can be driven to rotate by the output shaft 221 and then drive the big gear 233 to rotate. In the present invention, the transmission ratio of the pinion 232 to the big gear 233 is less than 6.

In the present invention, the motor 22 is set as an external rotor motor with a diameter greater than or equal to 50 mm, and the transmission ratio of the pinion 232 to the big gear 233 is set to less than 6, this is because: when an output speed (2000 SPM) and an output power of the motor 22 are both fixed, the external rotor can obtain a larger torque when the diameter is greater than or equal to 50 mm, and when the transmission ratio of the pinion 232 to the big gear 233 is less than 6, a better output effect and no-load current can be obtained, and the temperature rise of the motor 22 can be well controlled (generally less than 100K, that is, 100 degrees). For details, please refer to the experimental results listed in the following table.

| Diameter of external rotor | Rotating speed | Transmission ratio (gear module 1.25, pinion 18 teeth) | Temperature rise (ambient temperature 25 degrees) | Output speed | No-load current | Output Power |
|---|---|---|---|---|---|---|
| 30 mm | 12000 | 6 | 95 K | 2000 SPM | 3.5 A | equal |
| 40 mm | 10000 | 5 | 85 K | 2000 SPM | 3.0 A | |
| 50 mm | 5400 | 2.7 | 75 K | 2000 SPM | 2.0 A | |
| 50 mm | 5400 | 3.5 | 82 K | 2000 SPM | 2.6 A | |
| 50 mm | 5400 | 2 | 83 K | 2000 SPM | 2.9 A | |
| 64 mm | 5000 | 2.7 | 73 K | 2000 SPM | 2.0 A | |
| 70 mm | 4100 | 2.7 | 79 K | 2000 SPM | 2.3 A | |

By comparison of multiple groups of experiments in the above table, it is found that the best motor 22 (external rotor) has a diameter of 64 mm and the best gear transmission ratio is 17/46 (which is 2.7 in the above table), the best output effect is obtained under the condition that the output power is unchanged, and the energy consumption ratio is greatly improved.

The power transmission assembly 23 further has two eccentric wheel portions 2331 on opposite ends of the big gear 233, respectively, and two central axes of the two eccentric wheel portions 2331 do not overlap in a direction of the central axis of the big gear 233. The power transmission assembly 23 further has two crank rods 236 sleeved on the two eccentric wheel portions 2331, one end of the crank rod 236 is sleeved on the corresponding eccentric wheel portion 2331, and the other end of the crank rod is connected to the blade assembly 30, so that when the big gear 233 rotates, the crank rod 236 can be driven to move, and then drive the blade assembly 30 to move backward and forward, thereby perform a cutting operation. Preferably, the ends of the crank rods 236 connected to the eccentric wheel portions 2331 do not overlap in the center, and the other ends of the crank rods 236 connected to the blade assembly 30 overlap in the center, so as to achieve a stably power transmitting effect.

In the present invention, the assembly between the first bottom cover 2311 and the second bottom cover 2312 is achieved through the engagements of the screws 40 and the screw hole; of course, in other embodiment, other manners may be used to assemble the first bottom cover 2311 and the second bottom cover 2312, there are no restrictions here. In addition, it can be understood that a rotational connection between the pinion 232 and the fan 223, and a rotational connection between the eccentric wheel portion 2331 of the big gear 233 and the crank levers 236 are all achieved via bearing 60, that is existing art, so here is no detailed description.

The blower chamber 24, the heat dissipation fins 234 and the heat dissipation passage 235 are formed on a side of the first bottom cover 2311 facing the housing assembly 21. Specifically, the heat dissipation fins 234 are formed on the first bottom cover 2311 and are located on a side of the fan 223. An end of the heat dissipation passage 235 communicates with the blower chamber 24, and the other end of the heat dissipation passage 235 communicates with the outside, when the motor 22 rotates, the fan 223 rotates synchronously and drives air in the receiving cavity 2313 to be discharged outwardly along the heat dissipation passage 235, heat from the motor 22, the power transmission assembly 23 and the heat dissipation fins 234 will be taken away during this process, that can improve the heat dissipation efficiency of the trimmer 100 of the present invention.

It can be seen that the trimmer 100 of the present invention has better heat dissipation effect, waterproof and dust-proof effect, and is specifically embodied in the following aspects:
1. The metal top cover 213 is integrally formed and has a heat dissipation surface 2131;
2. Both the first shell 211 and the second shell 212 are metal shells, which can be regarded as heat sinks;
3. The fan 223 is sleeved on the output shaft 221 of the motor 22, and is located at the bottom of the housing assembly 21, and can dissipate the heat at the bottom of the housing assembly 21 to play a role in cooling;
4. The bottom cover 231 is provided with a heat dissipation channel 25, a plurality of heat dissipation fins 234 and a heat dissipation passage 235 between each two adjacent heat dissipation fins 234, which can take away heat on the motor 22, the power transmission assembly 23 and the heat dissipation fins 234 to plays a role in cooling;
5. The metal top cover 213 has a concave portion 2133 at a lower position thereof, which can guide rainwater at the edge of the mounting portion 2134 to the concave portion 2133, so as to has a waterproof effect. Relative to a shell formed by left and right patchwork shells in block-shaped, the top surface of the metal top cover 213 does not have any gap, and is not easy to leak water and dust, so as to realize a waterproof and dust-proof effect.

The trimmer 100 of the present invention can set the motor 22 as an external rotor motor with a diameter greater than or equal to 50 mm, and set the transmission ratio of the pinion 232 and the big gear 233 to less than 6 simultaneously, thereby ensuring the best output effect is obtained under a condition that the output power of the motor 22 is unchanged, and the motor 22 has a low speed, a large rotating torque, a low current, a small heat generation, and a greatly increased energy consumption ratio, so as to effectively control the temperature rise of the motor 22 and reduce no-load load, improve energy efficiency and extend the life of motor 22.

The trimmer 100 of the present invention designs the top cover over the motor 22 as a metal top cover 213, and the metal top cover 213 is integrally formed with a heat dissipation surface 2131, Simultaneously, the bottom cover 231 of the power transmission assembly 23 is provided with a blower chamber 24, a heat dissipation channel 25 at the bottom of the blower chamber 24, and a heat dissipation passage 235 between each two adjacent heat dissipation fins 234. Therefore, the trimmer 100 of the present invention not only has a good heat dissipation effect, but also has a waterproof and dust-proof effect, and so that it can work in a rainy day and a wet area without affecting the performance of the whole machine.

Embodiment 2

Present invention also provide another trimmer similar with the trimmer 100 in the embodiment 1, the difference is that the trimmer in embodiment 2 has a different rotor motor 70.

Figure 11:
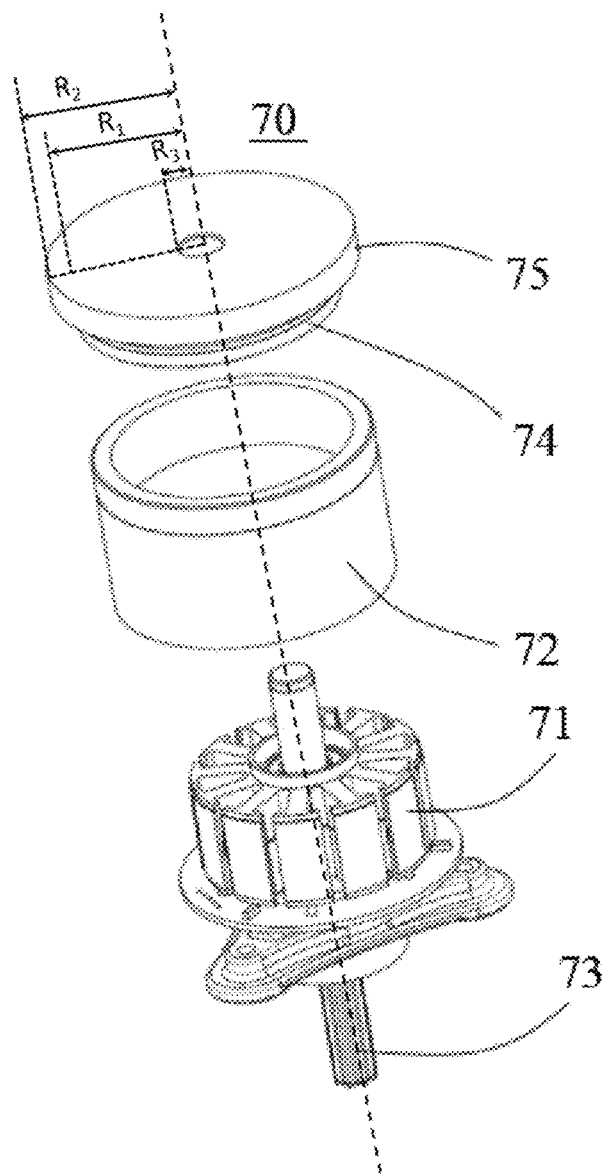
FIG. 11 is an exploded perspective view of an external rotor motor of a trimmer according to a second embodiment of the present invention.

Referring to FIG. 11, the external rotor motor 70 which can be powered by battery packs, includes a stator 71, an external rotor 72 and a motor output shaft 73. The external rotor motor 70 is adopted here for the external rotor 70 has a diameter larger than that of the traditional inner rotor, so that the external rotor motor 70 can bring a much larger inertia during a high-speed rotation to obtain a better cutting effect.

The external rotor 72 of the external rotor motor 70 is in a drum-shape and arranged around the stator 71, and rotates relative to the stator 71. The external rotor 72 is provided with a motor end cover 74 on an end thereof, the motor end cover 74 rotates synchronously with the external rotor 72, and can be fixedly connected with the external rotor 72 or integrally formed with the external rotor 72. The external rotor 72 of the external rotor motor 70 is provided with a flywheel flange 75, which is formed on an outside of the motor end cover 74 and outwardly protrudes a certain distance from the external rotor 72 in both the axial and the radial directions, so that the flywheel flange 75 has a radius larger than that of the external rotor 72 and also has a certain height. The flywheel flange 75 forms an annular flange in a circumferential direction of the motor end cover 74.

The flywheel flange 75 rotates in a same direction as the external rotor 72, the motor end cover 74, and the motor output shaft 73, and can provide a greater inertia during rotation. In other embodiments, the flywheel flange 75 may not be provided on the motor end cover 74, but may be directly provided at another position along the circumferential direction of the external rotor motor 70, or may be symmetrically arranged with respect to the motor output shaft 73. The flywheel flange 75, the motor end cover 74 and the external rotor 72 may be connected by fasteners, adhesives or welding, or may be integrally formed.

The output moment of inertia of the flywheel flange 75 can be calculated by the following formula to find a range value of its size:

$$MOI = \frac{1}{2} * (R_1)^2 + (R_2)^2) * m_{flange} + \frac{1}{2} * (R_3)^2 * m_{shaft};$$

Wherein MOI is the moment of inertia, $R_1$ is the inner radius of the flywheel flange 75, $R_2$ is the outer radius of the flywheel flange 75, $R_3$ is the radius of the motor output shaft 73, and m is the mass. When a radius of the flywheel flange 75 is 0.5-10 mm larger than that of the external rotor 72 and the inner radius $R_1$ of the flywheel flange 75 corresponding to the external rotor 72 is 27 mm, the outer radius $R_2$ of the flywheel flange 75 is 32 mm-42 mm, and the flywheel flange 75 is 2 mm-45 mm high. Specifically, the flywheel flange 75 is 15 min larger than that of the external rotor 72. The table below corresponds to the inertia moment and momentum of the flywheel flanges 75 with different sizes and with a motor speed of 6000 rpm, one flywheel flanges 75 has an outer radius of 32 mm and a height of 2 mm; and another flywheel flanges 75 has an outer diameter of 42 mm and a height of 45 mm, respectively.

| $R_1$ (mm) | 27 | 27 |
|---|---|---|
| $R_2$ (mm) | 32 | 42 |
| $H_{flange}$ (mm) | 2 | 45 |
| $m_{flange}$ (kg) | 0.203 | 0.29 |
| $R_3$ (mm) | 5 | 5 |
| $m_{shaft}$ (kg) | 0.076 | 0.076 |
| MOI (kg*m$^2$) | 0.00017888 | 0.000362435 |
| momentum (J) | 35.274 | 71.469 |

Figure 12:
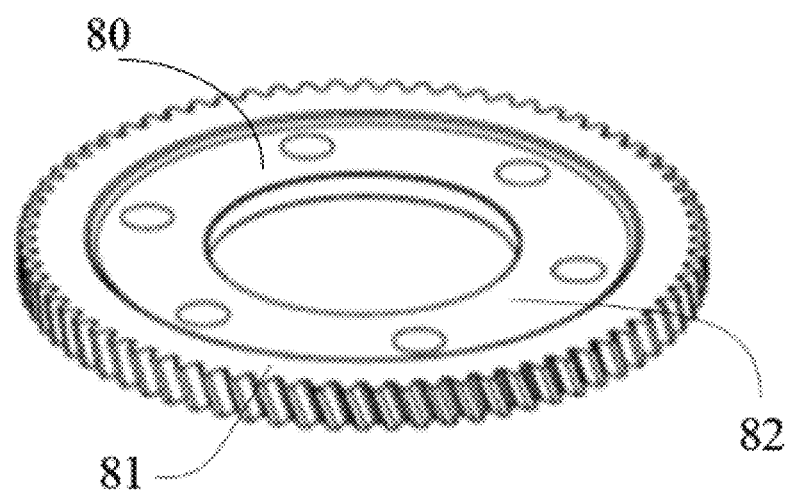
FIG. 12 is a perspective view of a flywheel flange and a big gear of a trimmer according to an alternative embodiment of the present invention.
Figure 13:
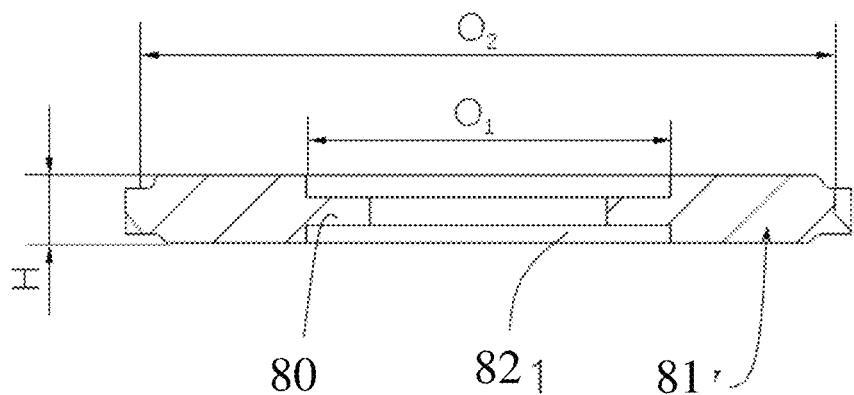
FIG. 13 is a cross-sectional view of the big gear in FIG. 12.

As an alternative embodiment of embodiment 2, as shown in FIG. 12 and FIG. 13, another big gear 80 is shown, which can replace the big gear 233 in the embodiment 1. The big gear 80 is connected with another flywheel flange 81, that is say a flange is added on an external periphery of the big gear 80 to increase the inertia when the big gear 80 rotates. The inertia generated by the big gear 80 in a high-speed rotation can make the cutting assembly 14 cut thicker branches more effectively. The flywheel flange 81 extends at a distance both in the axial direction and the radial direction of the big gear 80, thereby forming two recesses 82 on both sides of the big gear 80. The flywheel flange 81 and the big gear 80 can be assembled or integrally formed.

The output moment of inertia of the flywheel flange 81 can be calculated by the following formula to find its size range value:

$$MOI = \frac{1}{2} * (O_1/2)^2 + (O_2/2)^2) * m_{flange} + \frac{1}{2} * (R_3)^2 * m_{shaft};$$

Wherein MOT is the moment of inertia, $O_1$ is the inner diameter of the flywheel flange 81, $O_2$ is the outer diameter of the flywheel flange 81, $R_3$ is the radius of the motor output shaft (not shown), and in is the mass.

Wherein an inner diameter $O_1$ of the flange flywheel 81 is 40 mm, an outer diameter $O_2$ of the flange flywheel 81 is 54 mm-74 mm, and a height H of the flange flywheel 81 is 5 mm-13 mm. The table below corresponds to the inertia moment and momentum of the flywheel flanges 81 with different sizes and with a motor speed of 6000 rpm, one flywheel flanges 81 has an outer radius ($O_2$/2) of 27 mm and a height of 5 mm; and another flywheel flanges 81 is with an outer radius ($O_2$/2) of 37 mm and a height of 13 mm, respectively.

| $O_1$/2 (mm) | 20 | 20 |
|---|---|---|
| $O_2$/2 (mm) | 27 | 37 |
| $H_{flange}$ (mm) | 5 | 13 |
| $m_{flange}$ (kg) | 0.203 | 0.203 |
| $R_3$ (mm) | 5 | 5 |
| $m_{shaft}$ (kg) | 0.175 | 0.175 |
| MOI (kg*m$^2$) | 0.000116781 | 0.000182379 |
| momentum (J) | 23.028 | 35.964 |

It can be seen that the trimmer of the present invention increases the inertia of the rotor by outputting a flywheel flange 75/81 outside the external rotor motor 70 or the big gear 80 to output a large torque. Therefore, the speed of the motor can provide enough torque to cut the branches at 5000 to 6000 rpm/min. Because the speed of the motor is low, it is very close to the required output speed of the whole machine, so only a small reduction ratio is used to achieve the output of the required speed.

Figure 14:
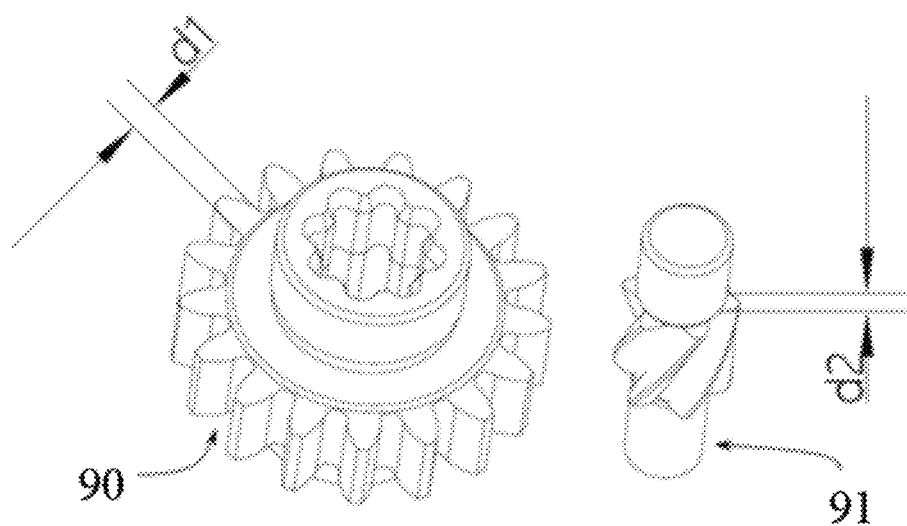
FIG. 14 is a comparison diagram of a pinion of the present invention and an existing pinion.

In this way, the gear module can be set larger, please refer to the structure comparison of a pinion 90 of the present invention shown in FIG. 14 and a pinion 91 used in the existing large reduction gear assembly, a width d1 (usually 2.2-2.3 mm) of the pinion 90 is significantly larger than the tooth width d2 (usually 1.4-1.5 mm) of the pinion 91 used in the existing art, which makes the pinion 90 have a higher strength during cutting work, and thus prolonging a service life of the trimmer. Moreover, due to the low speed of the motor, the trimmer of the present invention will have an increased endurance time and then obtain a longer running time, under a condition that same battery pack is used.

The trimmer in present invention can not only improve the cutting performance but also increase the endurance time without adding assembly parts. At the same time, the speed of the external rotor motor can be relatively low, and a large modulus gear can be used to increase the service life of the trimmer.

The above embodiments are only used to illustrate the technical solutions of the present invention, not for limitation. Although the present invention is described in detail with reference to the preferred embodiments, ordinary technicians in the field should understand that the technical solutions of the present invention may be modified or substituted without departing from the spirit and scope of the technical solutions of the present invention.

We claim:

1. A trimmer, comprising:
    a handle assembly,
    a power mechanism locating at one end of the handle assembly and having a housing assembly, a motor and a power transmission assembly both received in the housing assembly, the motor being an external rotor motor, the external rotor motor having an output shaft and the power transmission assembly having a pinion mounted on the output shaft of the external rotor motor and a big gear engaging with the pinion, and
    a blade assembly connected to the power mechanism,
    wherein the external rotor motor has a diameter greater or equal to 50 mm, and wherein a transmission ratio between the pinion and the big gear is less than 6;

wherein the motor includes a motor end cover located at one end of the motor, and wherein the flywheel flange is formed on the outside of the motor end cover.

2. The trimmer according to claim 1, wherein the diameter of the motor is 64 mm, and wherein the transmission ratio between the pinion and the big gear is 2.7.

3. The trimmer according to claim 1, wherein the power transmission assembly includes two eccentric wheel assembly respectively located at two opposite sides of the big gear and two crank rods each surrounding the corresponding eccentric-wheel assembly, and wherein the blade assembly and the eccentric wheel assembly are respectively located at two opposite sides of the crank rods.

4. The trimmer according to claim 3, wherein the motor has a stator mounted to the output shaft and an external rotor surrounded the stator, and wherein a flywheel flange is located on an outside of the external rotor.

5. The trimmer according to claim 4, wherein the external rotor is configured with a drum-shape.

6. The trimmer according to claim 4, wherein the flywheel flange outwardly protrudes a certain distance from the external rotor in both the axial and the radial directions of the external rotor, and wherein the flywheel flange forms an annular flange in a circumferential direction of the external rotor.

7. The trimmer according to claim 6, wherein a radius of the flywheel flange is 5-10 mm larger than that of the external rotor, and wherein an inner radius of the flywheel flange and the radius of the external rotor are 27 mm, and wherein an outer radius of the flywheel flange is 32 mm-42 mm, and the height of the flywheel flange is 2 mm-45 mm.

8. The trimmer according to claim 3, wherein a flywheel flange is located on an outside of the big gear.

9. The trimmer according to claim 1, wherein the motor has an external rotor surrounding the output shaft thereof and a chassis for housing the external rotor and the output shaft, and wherein a gap is formed between the external rotor and the chassis.

10. The trimmer according to claim 1, wherein the power transmission assembly has a bottom cover connected to a bottom of the housing assembly and a fan sandwiched between the bottom cover and the housing assembly, wherein the bottom cover defines a blower chamber for receiving the fan and a heat dissipation channel extending therethrough for air passing from the blower chamber to outside.

11. The trimmer according to claim 10, wherein the fan is connected to the output shaft of the motor, and wherein the heat dissipation is located at one side of the bottom cover away from the blade assembly.

12. The trimmer according to claim 11, wherein the bottom cover has two vents extending therethrough for communicating the blower chamber with outside, and wherein both heat dissipation channel and the vents are located below the fan.

13. The trimmer according to claim 10, wherein the bottom cover also includes at least two heat dissipation fins extending along a longitudinal direction thereof, and wherein each heat dissipation passage is formed between two adjacent heat dissipation fins, and wherein the blower chamber is surrounded by two outermost heat dissipation fins, and wherein each heat dissipation passage has one end communicating with the blower chamber and the other end communicating with the outside.

14. A trimmer, comprising:
a handle assembly,
a power mechanism locating at one end of the handle assembly and having a housing assembly, a motor and a power transmission assembly both received in the housing assembly, the motor being an external rotor motor, the external rotor motor having an output shaft and the power transmission assembly having a pinion mounted on the output shaft of the external rotor motor and a big gear engaging with the pinion, and
a blade assembly connected to the power mechanism,
wherein the external rotor motor has a diameter greater or equal to 50 mm, and wherein a transmission ratio between the pinion and the big gear is less than 6;
wherein the power transmission assembly includes two eccentric wheel assembly respectively located at two opposite sides of the big gear and two crank rods each surrounding the corresponding eccentric-wheel assembly, and wherein the blade assembly and the eccentric wheel assembly are respectively located at two opposite sides of the crank rods,
wherein a flywheel flange is located on an outside of the big gear, and
wherein the flywheel flange is disposed on an outer periphery of the big gear, and
wherein the flywheel flange extends outwardly from the big gear in both the axial direction and the radial direction of the big gear, and wherein two recesses are form on two opposite sides of the big gear.

15. The trimmer according to claim 14, wherein an inner diameter of the flange flywheel is 40 mm, and wherein an outer diameter of the flywheel flange is 54 mm-74 mm and the height of the flywheel flange is 5 mm-13 mm.

* * * * *